United States Patent [19]

Davis

[11] Patent Number: 5,168,959
[45] Date of Patent: Dec. 8, 1992

[54] OIL RECEIVING CONTAINER

[76] Inventor: Norman E. Davis, 6602 163rd St. Ct. East, Puyallup, Wash. 98373

[21] Appl. No.: 818,254
[22] Filed: Jan. 8, 1992
[51] Int. Cl.⁵ .............................................. F16N 33/00
[52] U.S. Cl. ................................. 184/1.5; 184/104.1; 184/106; 220/345; 392/379
[58] Field of Search ............ 220/345, 346, 256, 23.2, 220/23.4, 573; 184/104 R, 1.5, 106; 392/379, 382, 383

[56] References Cited

U.S. PATENT DOCUMENTS

| | | | |
|---|---|---|---|
| 2,022,559 | 11/1935 | Dwyer | 392/379 |
| 2,297,614 | 9/1942 | Fuchs | 392/382 |
| 2,790,693 | 4/1957 | Hosack | 220/345 |
| 3,527,373 | 9/1970 | Giraudet et al. | 220/345 |
| 3,985,511 | 10/1976 | Betts | 220/256 |
| 3,993,452 | 11/1976 | Moulding | 220/23.4 |
| 4,757,913 | 7/1988 | Yerman | 220/345 |

Primary Examiner—Ira S. Lazarus
Assistant Examiner—Alan B. Cariaso
Attorney, Agent, or Firm—Leon Gilden

[57] ABSTRACT

A container includes a plurality of spaced, "U" shaped grooves to receive a first lid and a second lid, wherein the first lid includes a matrix of apertures for reception of the pouring spout portions of fluid bottles such as those containing engine oil to permit capture and recycling of the oil as required. The second lid is arranged to afford protection to the first lid for permitting intrusion of foreign matter within the container.

1 Claim, 4 Drawing Sheets

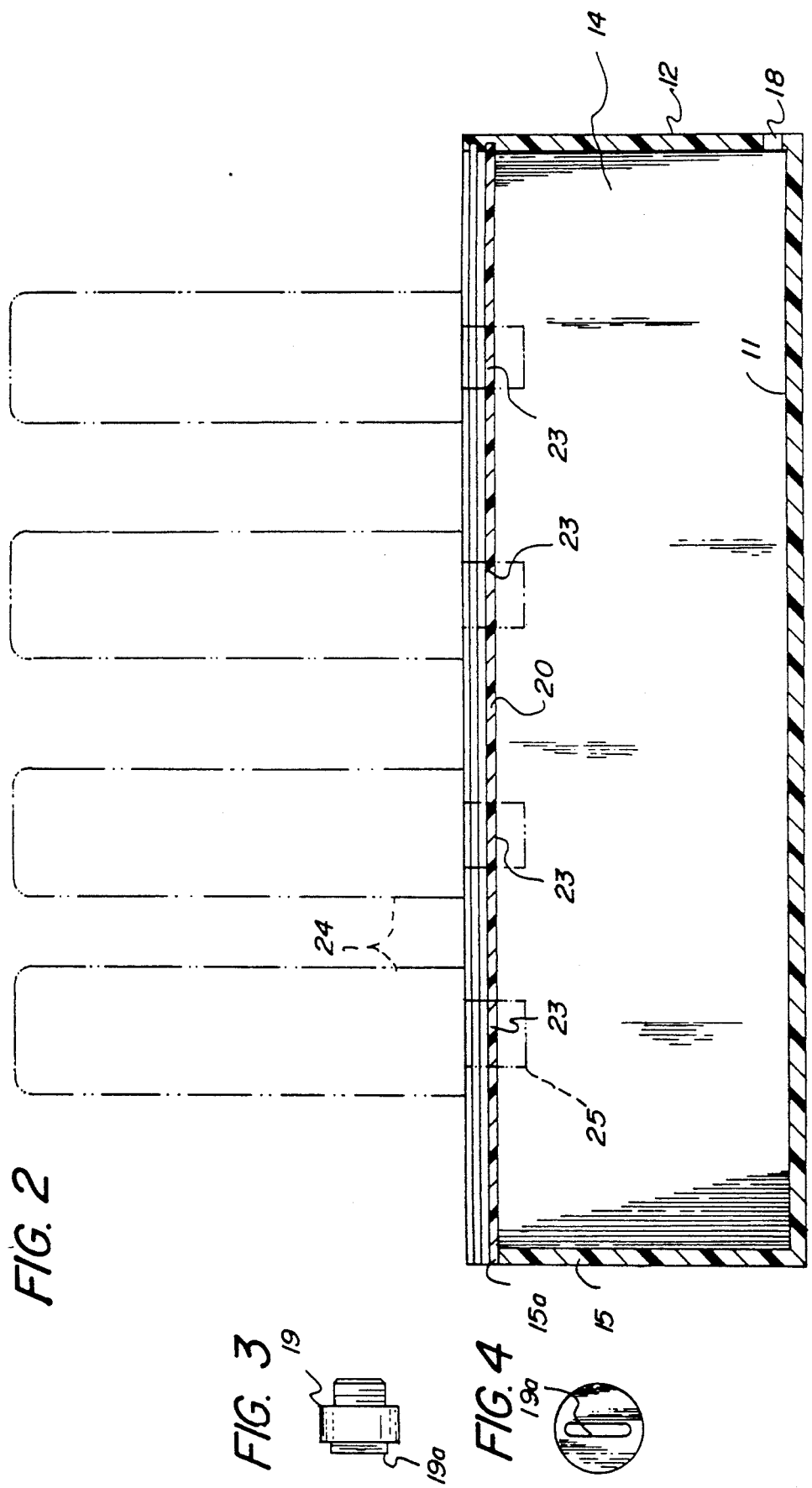

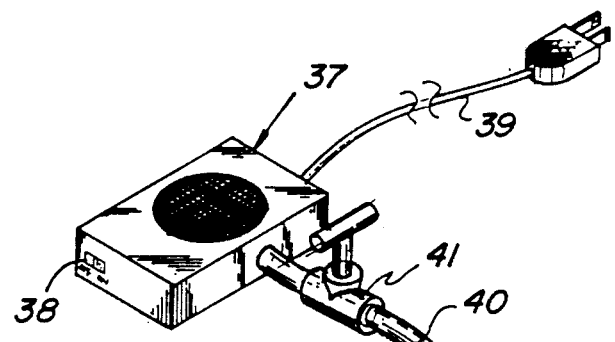
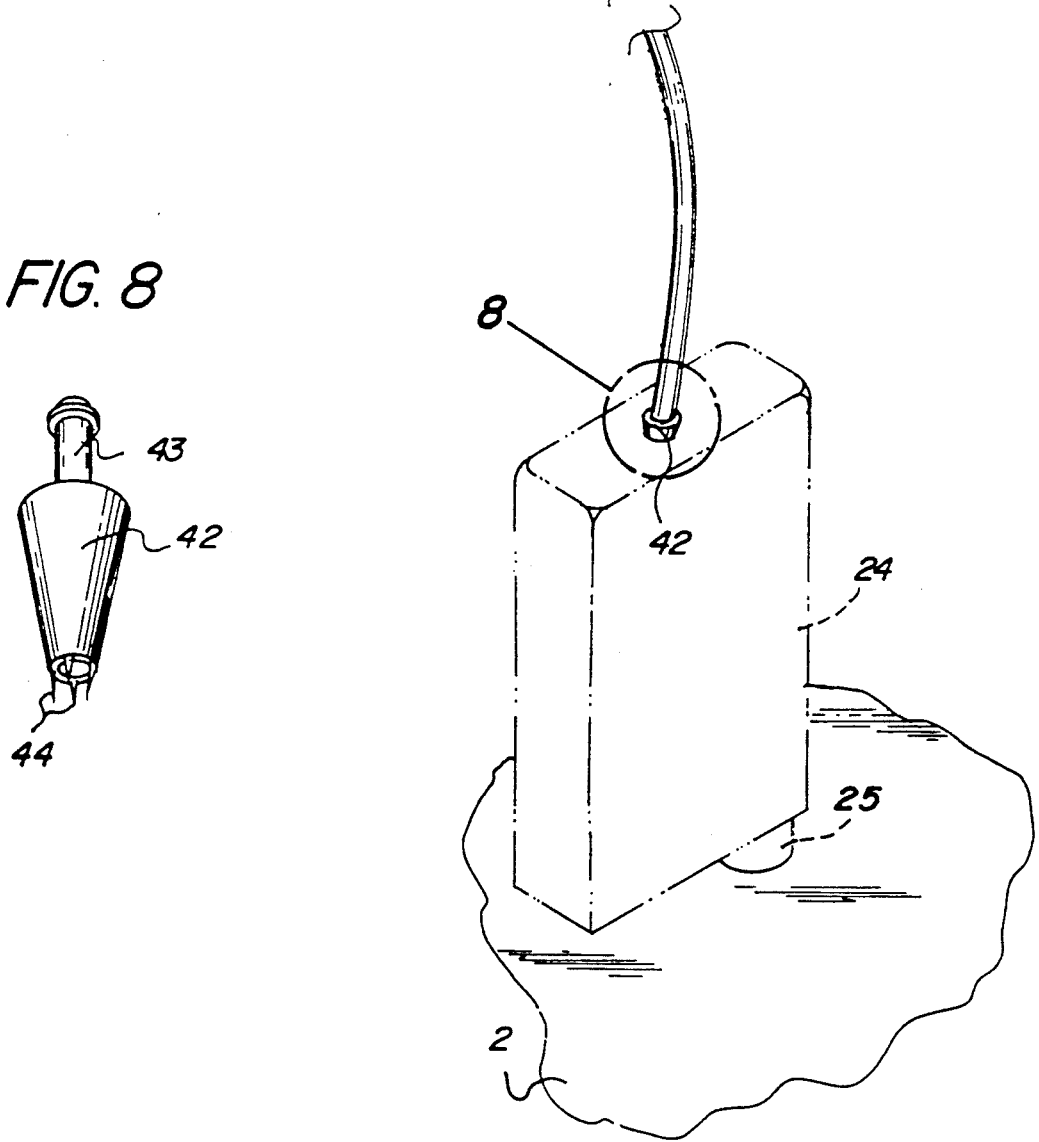

OIL RECEIVING CONTAINER

BACKGROUND OF THE INVENTION

1. Field of the Invention

The field of invention relates to oil reclaiming apparatus, and more particularly pertains to a new and improved oil receiving container for the reception and storage of engine oil.

2. Description of the Prior Art

Typically during the pouring of oil and its use into an engine, residual oil of a smaller portion remains within the container. Such oil is typically wasted, wherein to retrieve such oil, the instant invention sets forth an apertured plate to position and secure the oil containing bottle or container to direct the oil into the underlying receiving container of the invention.

Various prior art oil receiving structure is exemplified in U.S. Pat. No. 4,762,155 to Gruber wherein a granular clay receives waste oil from an associated engine during an oil changing procedure.

U.S. Pat. No. 4,815,591 to Tivy sets forth an oil changing apparatus wherein used engine oil is directed into the container of the organization.

U.S. Pat. No. 4,673,081 to Habig, et al. sets forth a waste oil drain collector and storage kit is provided for the reception of waste engine oil from engine crank cases.

As such, it may be appreciated that there continues to be a need for a new and improved oil receiving container as set forth by the instant invention which addresses both the problems of ease of use as well as effectiveness in construction in receiving and the accumulation of engine oil of oil bottles and in this respect, the present invention substantially fulfills this need.

SUMMARY OF THE INVENTION

In view of the foregoing disadvantages inherent in the known types of oil receiving containers now present in the prior art, the present invention provides an oil receiving container wherein the same is addressed for the positioning and the reception of engine oil from an associated engine oil bottle. As such, the general purpose of the present invention, which will be described subsequently in greater detail, is to provide a new and improved oil receiving container which has all the advantages of the prior art oil receiving containers and none of the disadvantages.

To attain this, the present invention provides a container including a plurality of spaced, "U" shaped grooves to receive a first lid and a second lid, wherein the first lid includes a matrix of apertures for reception of the pouring spout portions of fluid bottles such as those containing engine oil to permit capture and recycling of the oil as required. The second lid is arranged to afford protection to the first lid for permitting intrusion of foreign matter within the container.

My invention resides not in any one of these features per se, but rather in the particular combination of al of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved oil receiving container which has all the advantages of the prior art oil receiving containers and none of the disadvantages.

It is another object of the present invention to provide a new and improved oil receiving container which may be easily and efficiently manufactured and marketed.

It is a further object of the present invention to provide a new and improved oil receiving container which is of a durable and reliable construction.

An even further object of the present invention is to provide a new and improved oil receiving container which is susceptible of a low cost of manufacture with regard to both materials and labor, and which accordingly is then susceptible of low prices of sale to the consuming public, thereby making such oil receiving containers economically available to the buying public.

Still yet another object of the present invention is to provide a new and improved oil receiving container which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an orthographic view, taken along the lines 2—2 of FIG. 1 in the direction indicated by the arrows.

FIG. 3 is an orthographic view of section 3, as set forth in FIG. 1.

FIG. 4 is an orthographic top view of the oil plug as set forth in FIG. 3.

FIG. 7 is an isometric illustration of a heater assembly utilized by the invention.

FIG. 8 is an isometric illustration of section 8, as set forth in FIG. 7.

DESCRIPTION OF THE PREFERRED EMBODIMENT

Figure 1:
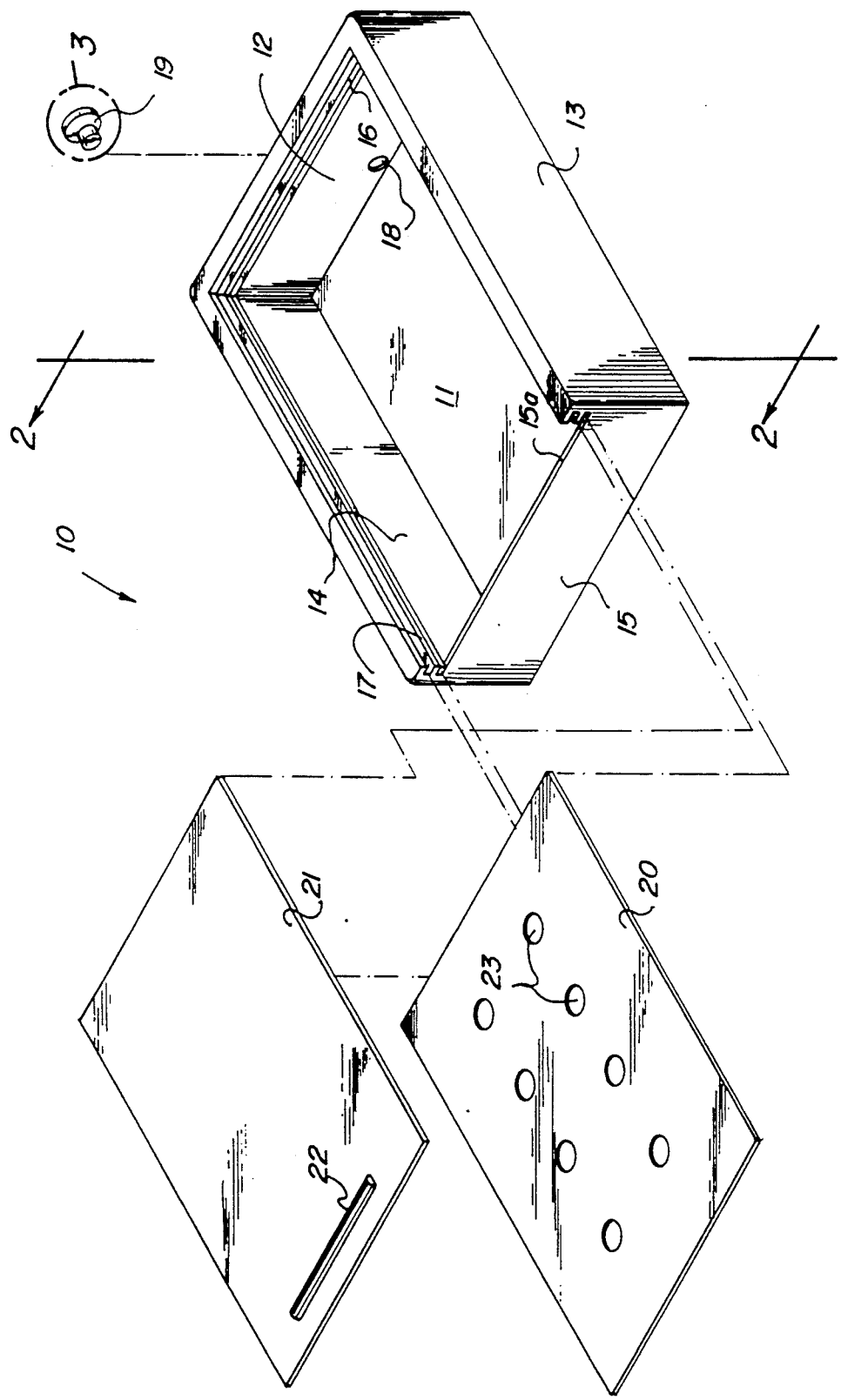
FIG. 1 is an isometric illustration of the invention.

With reference now to the drawings, and in particular to FIGS. 1 to 8 thereof, a new and improved oil receiving container embodying the principles and concepts of the present invention and generally designated by the reference numerals 10 and 10a will be described.

More specifically, the oil receiving container 10 of the instant invention essentially comprises a container, including a container floor 11, with a container rear wall 12, a first side wall 13, and a second side wall 14 defining a "U" shaped wall of an equal predetermined height, with a front wall 15 defined by a second height less than the predetermined height defining a front wall top edge 15a oriented below a respective first and second "U" shaped groove 16 and 17. The first and second "U" shaped grooves 16 and 17 are arranged parallel relative to one another positioned above the front wall top edge 15a with an interior surface of the rear wall, first side wall, and second side wall. The first "U" shaped groove 16 is arranged to receive a first slide plate 20, wherein the second "U" shaped groove 17 is arranged to receive a second slide plate 21. The second slide plate 21 is positioned to slide above the first slide plate and includes a second slide plate handle 22. The first slide plate 20 includes a matrix of first slide plate openings 23 defining a plurality of rows of such openings each arranged to receive a nozzle 25 of an associated oil container 24 to orient the container in an inverted orientation to direct oil within the container as illustrated. The rear wall 12 is formed with a rear wall opening 18, with a plug 19 selectively mounted within the rear wall to include a plug handle 19a (see FIGS. 3 and 4) for ease of insertion and removal of the plug relative to the opening. Subsequent to pouring of oil from the oil containers 24 into the associated container of the apparatus, the second slide plate 21 is directed over the first slide plate for the protection of the contents within the container of the apparatus preventing debris from entering and contamination thereof.

Figure 5:
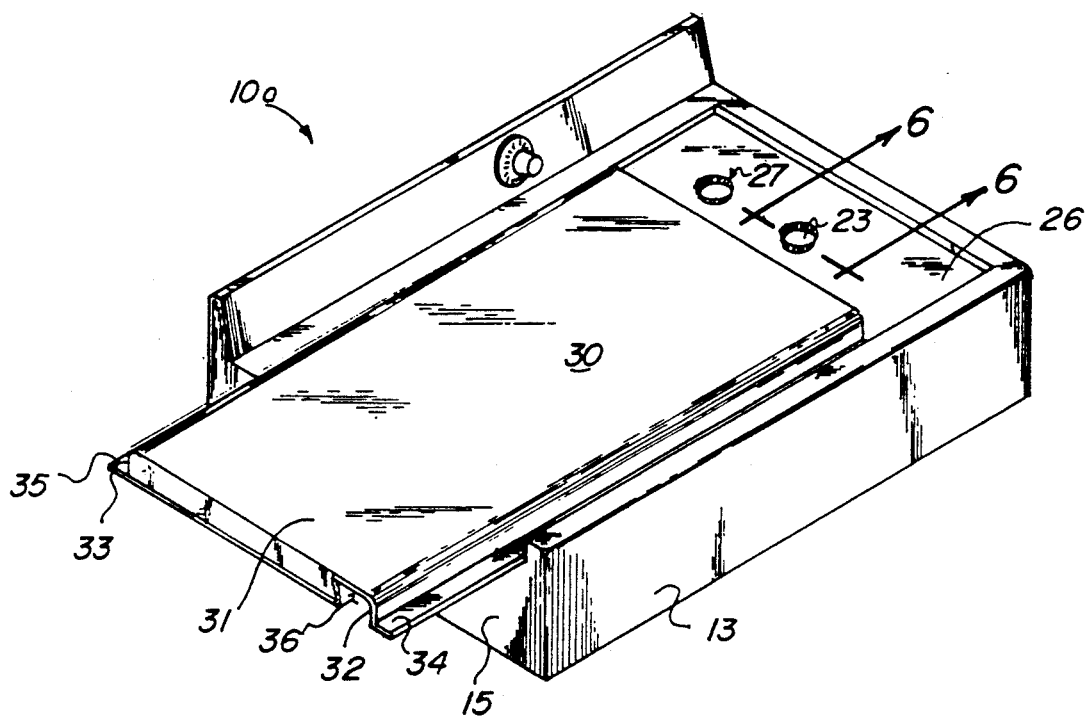
FIG. 5 is an isometric illustration of a modification of the invention.
Figure 6:
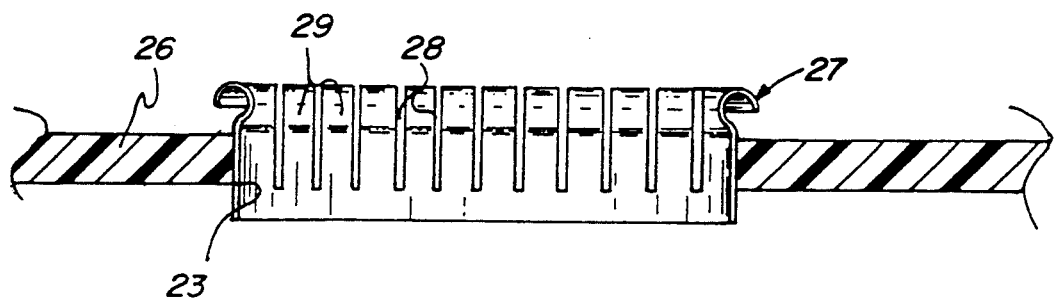
FIG. 6 is an orthographic view, taken along the lines 6—6 of FIG. 5 in the direction indicated by the arrows.

The FIG. 5 illustrates the use of a modified apparatus 10a, including a modified first slide plate 26, wherein each of the openings 23 includes a spring ring 27 concentrically mounted in surrounding relationship relative to each opening, with the spring ring including spring slots 28 defining spring finger plates 29 arranged concentrically within the opening in surrounding relationship thereto about the perimeter of each opening to enhance securement of the container nozzle directed into the modified slide plate 26. A modified second slide plate 30 is provided, including a modified slide plate top wall 31 and slide plate side walls 32 and 33 defining a second top plate cavity 30 to receive the spring rings 27 therewithin. The first and second top plate side walls 32 and 33 include respective first and second side wall flanges 34 and 35 received within the second "U" shaped groove 17.

The FIGS. 7 and 8 illustrate the use of a heater assembly 37 mounting a switch 38 to effect selective actuation of the heater assembly directing power from electrical power supply 39, wherein heat from typical sources such as electrical resistance coils direct heated air into the heating conduit 40 by way of a conduit valve 41 providing for selective closure of the heating conduit as required. The heated air thusly is directed through the conduit 40 into a directing cone 42 that is arranged to pierce a bottom wall of the oil container 24. The directing cone 42 includes spikes 44 that are concentrically mounted about an exit opening of the cone 42 coaxially oriented relative to the cone. A cone mounting conduit 43 is arranged to receive the heating conduit 40 to direct heated air into the conduit and subsequently into the associated oil container for the heating of remaining oil within the container and directing such into the receiving container of the apparatus.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An oil receiving container, comprising,
    a receiving container defining a container floor, including a rear wall, a first side wall, and a second side wall, wherein the first side wall, second side wall and the rear wall define a predetermined height and a "U" shaped configuration, and
    a front wall extending between the first side wall and the second side wall arranged parallel to the rear wall, wherein the front wall is defined by a second predetermined height less than the first predetermined height, and
    a first "U" shaped groove and a second "U" shaped groove defined within an interior surface of the first side wall, second side wall, wherein the second "U" shaped groove is positioned above the first "U" shaped groove, and
    the first "U" shaped groove slidable receives a first slide plate, and the second "U" shaped groove slidably receives a second slide plate, wherein the second slide plate defines a fluid impermeable slide plate including a handle, and
    the first slide plate underlying the second slide plate includes a matrix of apertures directed therethrough, and the rear wall includes a rear wall opening, the rear wall opening further includes an opening plug, the opening plug selectively and complementarily positioned within the rear wall opening, and each first slide plate aperture of said matrix of first slide plate apertures includes a spring ring mounted within each aperture in contiguous communication with a peripheral edge of each aperture and each spring plate includes a plurality of spaced parallel spring finger plates concentrically mounted about each respective slide plate aperture, and the second slide plate includes a second slide plate first side wall and a second slide plate second side wall, the second slide plate first slide wall includes a first flange and the second slide plate second side wall includes a second flange, wherein the first flange and the second flange are arranged for sliding reception within the second groove, and the second slide plate includes a slide plate top wall spaced above the first flange and the second flange to define a second slide plate cavity arranged for reception of each spring ring of each slide plate aperture of said first slide plate, and a heater assembly, wherein the heater assembly includes a heater housing, the heater housing including a heater conduit directed from the heater housing, with a heater conduit valve mounted within the heater conduit, and a free distal end of the heater conduit spaced form the heater housing includes a directing cone mounted thereto, the directing cone including an exit opening, the exit opening including a plurality of spikes mounted concentrically about the exit opening arranged parallel relative to an axis of the cone for projection within a bottom wall of an associated fluid container to direct heat in the fluid container to enhance removal of fluid from the fluid container into the receiving container when the oil container is positioned within one of said first slide plate apertures.

* * * * *